United States Patent [19]

Richards et al.

[11] Patent Number: 4,820,340

[45] Date of Patent: Apr. 11, 1989

[54] METHOD FOR SLAG FUMING AND REDUCTION

[75] Inventors: Gregory G. Richards, Burnaby; Steven L. Cockcroft, Delta; James K. Brimacombe, Vancouver; Gerald W. Toop, Trail, all of Canada

[73] Assignees: Cominco Ltd; University of British Columbia, both of Vancouver, Canada

[21] Appl. No.: 86,412

[22] Filed: Aug. 17, 1987

[30] Foreign Application Priority Data

Aug. 18, 1986 [CA] Canada ................................. 516181

[51] Int. Cl.$^4$ .............................................. C22B 13/00
[52] U.S. Cl. ......................................... 75/24; 75/30; 75/42
[58] Field of Search .................................. 75/24, 30, 42

[56] References Cited

U.S. PATENT DOCUMENTS

| 3,891,428 | 6/1975 | Yordanov et al. | 75/30 |
| 4,009,024 | 2/1977 | Miller | 75/24 |
| 4,252,563 | 2/1981 | Sundström | 75/24 |
| 4,639,269 | 1/1987 | Hilbrans et al. | 75/24 |

Primary Examiner—Deborah Yee
Attorney, Agent, or Firm—Arne I. Fors; Robert F. Delbridge

[57] ABSTRACT

The slag fuming process for the recovery of metal values from a slag from the smelting of non-ferrous metal concentrates is carried out more efficiently with lower quantities of fuel-reductant by injecting a portion of the fuel/reductant through one or more high-velocity tuyeres which replace or are in addition to a number of the standard tuyeres in the fuming furnace.

7 Claims, No Drawings

METHOD FOR SLAG FUMING AND REDUCTION

This invention relates to the fuming and reduction of metallurgical slags and, more particularly, to a method of fuming metallurgical slags for the recovery of metals by increasing the entrainment of reductant directly into the slag.

BACKGROUND OF THE INVENTION

According to known processes, metallurgical slags such as obtained from the smelting of non-ferrous metal concentrates that contain metal values such as zinc, tin, lead, cadmium, indium, arsenic, antimony and germanium are subjected to a continuous or batch-wise fuming operation by supplying slag in molten or solid form, an oxygen-containing gas, and a fuel and reductant such as natural gas or fuel gas, coal or coke to a fuming furnace. The vapors emanating from the furnace contain the volatile constituents from the slag which are condensed and the condensed metal values are recovered. Alternatively, the vapors are oxidized, condensed and recovered as oxide fumes. In the latter case, the amount of oxygen in the oxygen-containing gas should be sufficient to maintain the temperatures in the furnace sufficiently high, e.g., 1100°–1300° C., to enable the removal of the volatile constituents from the slag. Additional oxygen-containing gas may be supplied above the slag to ensure complete combustion of the reductant and oxidation of metal values to oxides.

DESCRIPTION OF THE PRIOR ART

Conventional slag-fuming processes, such as, for example, disclosed in Canadian Pat. Nos. 620 885, 730 086, 832 378, 846 728, 905 684 and 1 080 483, and in the Journal of Metals, June 1969, pages 15–21 and Metallurgical Transactions B, volume 16B, September 1985, pages 513–527, operate according to the above generalized description. These processes have important disadvantages in that they all use large quantities of fuel/reductant and oxygen-containing gas and generally operate with a uniform distribution of the large quantities of fuel/reductant over the entire furnace. These disadvantages have generally been accepted in the industry. Any attempts to improve the process have been in optimizing conventional parameters. Such an attempt is discussed in "Development and Application of Computer Model of the Slag Fuming Process at Port Pirie", R. M. Grant and L. J. Barnett, the Australasian I.M.M. Conference, South Australia, June 1975, pages 247–265.

SUMMARY OF THE INVENTION

It has now been discovered that the foregoing disadvantages can be substantially overcome and that the slag fuming process can be operated with considerably smaller quantities of fuel/reductant by controllably contacting and entraining the fuel/reductant in the slag. We have found that the actual reduction of metal values in the slag to a vapor state occurs on the fuel/reductant, which is entrained in the slag by the gas injection. At pressures at which gas is blown into the slag under normal fuming conditions, the gas issues from a tuyere in the form of discrete bubbles. These bubbles rise substantially vertically from the tuyere and break up into smaller bubbles. About one third of the fuel/reductant injected with gas through the tuyeres is entrained in the slag. Reductant has been observed in slag samples taken from the furnace. The remaining fuel/reductant is largely combusted, with a small portion passing through the furnace unconsumed. The fuming and reduction process can thus be considered to be two concurrent processes, i.e. reduction of metal values on entrained fuel/reductant in the slag, and combustion and heating of the slab by combustion of fuel/reductant by injected oxygen-bearing gas.

Based on these findings, we have discovered that injection of fuel/reductant—fluid mixtures at high velocity can be used to obtain the necessary reduction. A portion of the total amount of fuel/reductant fed to the fuming process is supplied through a small number of the tuyeres in the furnace, which tuyeres are high-velocity tuyeres. The number of high-velocity tuyeres depends on the furnace design and is conveniently from one to four. The amount of fuel/reductant supplied through the high-velocity tuyeres is in the range of about 20 to 60% of the total amount of fuel/reductant supplied to the fuming process. The fuel/reductant is conveniently injected by means of a fluid which may be a liquid or a gas. The velocity of the mixture of the fuel/reductant and the fluid through the high-velocity tuyere(s) is greater than about 50 m/s and is preferably in the range of about 80 to 115 m/s. The remaining portion of the fuel/reductant, and the oxygen-bearing gas are injected into the molten slag through the remaining (standard) tuyeres at the known low velocities to combust the fuel/reductant for the provision of heat to the process and of a sufficiently high temperature in the furnace. The fluid injected with the fuel/reductant through the high-velocity tuyere(s) can be an oxygen-bearing gas, such as air, oxygen, or oxygen-enriched air, or a nonoxygen-bearing gas such as nitrogen, argon, natural gas, or the like, or can be a liquid such as water, liquid hydrocarbon and the like, or can be a mixture of one or more of the above-named gases and liquids. The substantial removal of the volatile constituents from the slag can be achieved considerably faster and with less fuel/reductant. The amount of fuel/reductant is used more efficiently. Consequently, the slag fuming process can be carried out more economically than heretofore possible.

Accordingly, there is provided a method for the fuming of metallurgical slag containing non-ferrous metal values including zinc and lead which method includes feeding molten slag to a furnace and injecting a fuel/reductant and an oxygen-bearing gas into said molten slag through a multiplicity of tuyeres in amounts sufficient to volatilize the volatile constituents in the slag, characterized in that a portion of said fuel/reductant is injected with a fluid into said molten slag through at least one high-velocity tuyere at a velocity greater than the velocity of said fuel/reductant and oxygen-bearing gas injected through the remaining tuyeres. The fluid injected through the high-velocity tuyeres is chosen from compounds selected from air, oxygen-enriched air, argon, nitrogen, natural gas and the like, water, liquid hydrocarbons and the like, and mixtures of one or more of the liquid and gaseous fluids.

Preferably, the number of high-velocity tuyeres is from one to four; the exit velocity of the fuel/reductant-fluid mixture from the high velocity tuyere(s) is at least about 50 m/s and is, most preferably, in the range of about 80 to 115 m/s; the fluid is supplied to the high-velocity tuyere(s) at a pressure of at least about 400 kN/m$^2$ and, most preferably, at a pressure in the range of about 400 to 700 kN/m$^2$; the ratio between the fuel/reductant and a gas as fluid at the high-velocity tuyere(s) is in the range of about 25 to 35 kg/normal m$^3$; the fuel/reductant is coal; and the most preferred fluid is air.

DETAILED DESCRIPTION

The method of the invention will now be described in detail as a preferred embodiment in comparison with the conventional method, and both carried out in the same furnace. According to a slag fuming process and furnace described in the AIME World Symposium on Mining & Metallurgy of Lead & Zinc, Volume II, AIMME & PE, 1970, pages 330–347 slag from lead blast furnaces is treated directly in a slag fuming furnace for the recovery of lead, zinc, indium, cadmium, tin, arsenic, antimony, germanium and other values. Slag fuming is carried out on a batch basis in a substantially rectangular, water-jacketed furnace wherein the slag is blown with a mixture of fuel/reductant, preferably powdered coal, and oxygen-bearing gas is injected under pressure through a multiplicity of tuyeres arranged in the sides of the furnace. The preferred oxygen-bearing gas is air, but it is understood that oxygen-enriched air may also be used. The coal-to-air ratio is controlled to maintain strongly reducing conditions, thereby fuming the volatile metals from the slag. Metal vapors are subsequently re-oxidized with air above the bath of molten slag. The mixture of fumes including metal oxides is carried from the furnace by the gases through waste heat boilers and cooling flues to a baghouse where the fumes are collected.

The throughput of the furnace is dependent on the fuming rate of zinc, which is a function of the composition of the slag, and on the economics, which dictate the extent to which zinc is desired to be fumed from the slag.

The slag fuming furnace, according to the AIME reference, supra, and used conventionally and in the method of the present invention, has inside nominal dimensions of 3 m × 3 m × 7.9 m long. The floor consists of a number of cast iron sole jackets that have extra-heavy cooling pipes cast into them. The lower part of the side walls is formed by mild steel tuyere jackets. The inside face of these tuyere jackets slopes outward from the centre line of the furnace, giving adequate cooling space. Welded to these races and onto the end jacket faces are bell-shaped studs. The gridwork of studs and slope serves to retain a slag coating on the face of the jackets. The slope also aids slag circulation on blast penetration. The water jackets are controlled automatically at about 95° C.

The roof is of water-jacket construction. Above the furnace is a combustion chamber of water-tube membrane construction that continues to a waste heat boiler.

The furnace contains 72 standard tuyeres, 36 on each side and each located 178 mm from the bottom of the furnace. Each tuyere consists of a double inlet, one for handling pulverized coal supplied through a 19.1 mm diameter pipe and the other for blast air supplied through a 38.1 mm diameter pipe. Each tuyere is fitted with a ball valve for access with a cleaning rod and an insert-type thermocouple.

Molten slag and potshell are charged through a water-cooled hopper which projects from the front of the furnace. If desired, granulated blast furnace slag may be fed by gravity or air injectors across the surface of the slag bath. The fumed slag is tapped through two tap holes located in the end opposite the end of the furnace in which the charge hopper is situated. The tap holes are positioned some distance below the line of tuyeres of the furnace. If desired, the tapped slag may be granulated.

According to the conventional operation of the fuming process in the furnace, 50 t (tonne) of molten slag containing 17% Zn and having a temperature of 1200° C. was charged into the furnace through the water-cooled inlet hopper over a period of 30 minutes. This was followed by a heating period of about 30 minutes. During this time, the exothermic combustion of the coal in the coal-air mixture raised the temperature of the slag to 1300° C. When this slag temperature was reached, the main slag fuming cycle began with an air input rate of 4.7 Nm$^3$/min (normal cubic meter/minute) supplied to each tuyere. Pulverized coal of about 80%–200 mesh (B.S.S.) was injected through each tuyere and into the molten slag at a rate of 1.4 kg/min. The coal to air ratio was 0.30 kg coal per Nm$^3$ of air. The air was supplied to the tuyeres under a pressure of about 50 kN/m$^2$ (kilo Newton per square meter or kilo Pascal). The exit velocity of the coal-air mixture at the outlet of each tuyere was 36 m/s. Tertiary air was admitted to the furnace through the inlet hopper and the amount was unregulated but sufficient to ensure the oxidation of the metallic vapors. The last mentioned feed rates of coal and air were maintained until the zinc content of the slag was reduced to 2%, which content was reached after 120 minutes, for a total treatment time for the batch of 180 minutes. During this period of 120 minutes, the slag temperature decreased to 1220° C.

In the process according to the invention, one high-velocity tuyere having a fuel/reductant-fluid inlet with a diameter of 6.8 mm, replaced one of the 72 standard tuyeres. 50 t of molten slag (17% Zn) having a temperature of 1220° C. was charged to the furnace over a 30 minute period. After a heating period of about 30 minutes, the slag reached 1280° C. The main slag fuming cycle began. Air was supplied to each standard tuyere under a pressure of about 50 kN/m$^2$, and air as the most preferred fluid, was supplied to the high velocity tuyere under a pressure in the range of about 400 to 700 kN/m$^2$ giving exit velocities of about 36 m/s and about 80 to 115 m/s, respectively. The air supply rate to each standard tuyere was 4.7 Nm$^3$/min and to the high-velocity tuyere, was 0.45 Nm$^3$/min. Pulverized coal was injected at a rate of 15 kg/min to the high-velocity tuyere and at a rate of 1.2 kg/min to each standard tuyere. The coal to air ratio for the high-velocity tuyere was 33 kg coal per Nm$^3$ air and for each standard tuyere 0.26 kg coal per Nm$^3$ air. Tertiary air was admitted, as in conventional operation, to ensure the oxidation of metallic vapors. After 96 minutes the fuming was completed, for a total treatment time for the batch of 156 minutes. The Zn content of discharged slag was 2% and the discharging slag had a temperature of 1220° C. This operation resulted in a time saving of about 20% of the main fuming cycle compared with conventional conditions with standard tuyeres only. It can be calculated that the consumption of coal was also reduced by about 20%.

When two high-velocity tuyeres are used, these tuyeres are preferably positioned diagonally opposite each other. The diagonally opposite position of the two tuyeres causes a circulation of the bath, enhancing the rate of fuming. If desired, for high velocity tuyeres, one each approximately positioned in a corner of the furnace, may be used. If desired, rather than replacing one or more standard tuyeres with high-velocity tuyeres, one or more high-velocity tuyeres may be added. Generally, the number of high-velocity tuyeres depends on the geometry of the furnace, and it is understood that more than four high-velocity tuyeres may be used if required to obtain the desired results.

The amount of fuel/reductant supplied to the process must be sufficient to attain and maintain the desired temperature and to effect the reduction. This condition limits the number of high-velocity tuyeres that can be used. For the furnace and fuming conditions as described herein, the maximum number of high-velocity tuyeres that can be used as about four. While not being bound by theoretical considerations, it is thought that the normal standard tuyeres effect the heating and the high-velocity tuyeres effect the necessary reduction. These effects are also realized by an uneven distribution between the amounts of fuel/reductant supplied to the tuyeres. Thus, in the above example, about 30% of the coal was supplied to the high-velocity tuyere, while the remaining about 70% was supplied to the standard tuyeres.

Although the invention has been described in detail with reference to a specific furnace and a specific set of operating conditions, it is understood that variations and modifications can be used without detracting from the spirit of the invention. In particular, the invention may be applied to operations that carry out slag fuming and reduction on a continuous basis in which slag is continuously charged to and withdrawn from a furnace.

The slag fuming process according to the invention is, in general, carried out by using at least one tuyere through which a portion of the fuel/reductant, such as coke or coal, preferably coal, in the range of about 20 to 60% of the total amount of fuel/reductant supplied to the fuming process, is injected with a fluid into the bath of molten slag at a rate higher than the remaining portions of fuel/reductant injected through the other tuyeres in the furnace. The higher rates are such that the velocity of the fuel/reductant-fluid mixture at the exit of the at least one tuyere is at least about 50 m/s. Preferably, the velocity is in the range of about 80 to 115 m/s. The fuel/reductant is injected through the high-velocity tuyere(s) with a suitable fluid, which may be a liquid or a gas. Suitable gases are oxygen-bearing gaes, or non-oxygen-bearing or inert gases. The gas is preferably chosen from the group consisting of air, oxygen, oxygen-enriched air, nitrogen, argon, natural gas and the like. The most preferred gas is air. If desired, the gas may be preheated. Suitable liquids are water, suitable liquid hydrocarbons and the like. If desired, a mixture of one or more of the gases and liquids may be used for the injection of fuel/reductant through the high-velocity tuyere(s). If desired, the fuel/reductant may be injected through the high-velocity tuyere(s) as a slurry of the fuel/reductant with a liquid fluid. The fluid is supplied to the at least one high-velocity tuyere at a pressure of at least about 400 kN/m². Preferably, the pressure is in the range of about 400 to 700 kN/m². In the case of the fluid being a gas, the fuel/reductant to gas ratio at the at least one high-velocity tuyere is in the range of about 25 to 35 kg fuel/reductant per normal m³ gas.

What we claim as new and desire to protect by Letters Patent of the United States is:

1. The method for the fuming of metallurgical slag containing non-ferrous metal values including zinc and lead which method includes feeding molten slag to a furnace and injecting a fuel/reductant and an oxygen-bearing gas into said molten slag through a multiplicity of tuyeres in amounts sufficient to volatilize the volatile constituents in the slag, characterized in that a portion of said fuel/reductant is injected with a gas at a ratio between said fuel/reductant and said gas in the range of about 25 to 35 kg fuel/reductant per normal m³ gas into said molten slag through at least one high-velocity tuyere at a velocity greater than the velocity of said fuel/reductant and oxygen-bearing gas injected through the remaining tuyeres, said velocity through said at least one high velocity tuyere being in the range of about 50 to 115 m/s at a pressure in the range of about 400 to 700 kN/m², for contact with and entrainment of the fuel/reductant into said molten slag.

2. A method as claimed in claim 1, wherein the number of high-velocity tuyeres is in the range of one to four.

3. A method as claimed in claim 1, wherein said fuel/reductant is coal.

4. A method as claimed in claim 1, wherein said said gas is chosen from the group consisting of air, oxygen, oxygen-enriched air, nitrogen, argon and natural gas.

5. A method as claimed in claim 1, wherein said portion of fuel/reductant is in the range of about 20 to 60% of the total amount of fuel/reductant injected into said molten slag.

6. A method for the fuming of metallurgical slag containing non-ferrous metal values including zinc and lead in a furnace having a multiplicity of tuyeres including one to four high-velocity tuyeres, said method comprising the steps of:
  (a) feeding molten slag to said furnace;
  (b) injecting pulverized coal and air into said molten slag through said multiplicity of tuyeres in amounts sufficient to volatilize the volatile constituents in the slag; and
  (c) injecting an amount in the range of about 20 to 60% of said injected pulverized coal through said high-velocity tuyere(s) with air supplied at the pressure in the range of about 400 to 700 kN/m² in the range of about 25 to 35 kg coal per normal m³ air at a velocity through the exits of said high-velocity tuyere(s) in the range of about 80 to 115 m/s.

7. A method as claimed in claim 6 wherein said air is preheated.

* * * * *